US010715526B2

(12) United States Patent
Nightingale et al.

(10) Patent No.: US 10,715,526 B2
(45) Date of Patent: Jul. 14, 2020

(54) MULTIPLE CORES WITH HIERARCHY OF TRUST

(71) Applicant: Microsoft Technology Licensing, LLC, Redmond, WA (US)

(72) Inventors: Edmund B. Nightingale, Bellevue, WA (US); Reuben R. Olinsky, Seattle, WA (US); Galen C. Hunt, Bellevue, WA (US); Douglas Stiles, Livermore, CA (US); George Thomas Letey, Louisville, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/443,912

(22) Filed: Feb. 27, 2017

(65) Prior Publication Data

US 2018/0165448 A1 Jun. 14, 2018

Related U.S. Application Data

(60) Provisional application No. 62/434,283, filed on Dec. 14, 2016.

(51) Int. Cl.
G06F 15/177 (2006.01)
G06F 9/00 (2006.01)
H04L 29/06 (2006.01)
G06F 21/74 (2013.01)

(52) U.S. Cl.
CPC .............. H04L 63/10 (2013.01); G06F 21/74 (2013.01)

(58) Field of Classification Search
CPC .... G06F 21/53; G06F 9/4401; G06F 21/6218; G06F 1/14; G06F 2221/2149; H04L 63/10
See application file for complete search history.

(56) References Cited

U.S. PATENT DOCUMENTS 4,814,970 A 3/1989 Barbagelata et al.
5,774,546 A 6/1998 Handelman et al.
5,835,594 A 11/1998 Albrecht et al.
(Continued)

FOREIGN PATENT DOCUMENTS

CN 102118393 B 7/2011
CN 105718807 A 6/2016
WO 2010057312 A1 5/2010

OTHER PUBLICATIONS

"International Search Report and Written Opinion Issued in PCT Application No. PCT/US2017/065213", dated Feb. 6, 2018, 12 pages.
(Continued)

Primary Examiner — Xuxing Chen
(74) Attorney, Agent, or Firm — David Chin; Chin IP, PLLC

(57) ABSTRACT

The disclosed technology is generally directed to integrated circuit technology with defense-in-depth. In one example of the technology, an integrated circuit includes a set of independent execution environments including at least two independent execution environments. At least two of the independent execution environments are general purpose cores with differing capabilities. The independent execution environments in the set of independent execution environments are configured to have a defense-in-depth hierarchy.

18 Claims, 5 Drawing Sheets

(56) References Cited

U.S. PATENT DOCUMENTS

| | | | |
|---|---|---|---|
| 6,631,474 B1* | 10/2003 | Cai | G06F 1/3203 713/300 |
| 7,461,374 B1 | 12/2008 | Balint et al. | |
| 7,480,907 B1 | 1/2009 | Marolia et al. | |
| 8,201,161 B2 | 6/2012 | Challener et al. | |
| 8,473,754 B2 | 6/2013 | Jones et al. | |
| 8,489,898 B2 | 7/2013 | Wong | |
| 8,576,361 B2 | 11/2013 | Nam et al. | |
| 8,667,270 B2 | 3/2014 | Brutch et al. | |
| 8,898,654 B2 | 11/2014 | Young et al. | |
| 8,959,576 B2 | 2/2015 | Sastry et al. | |
| 8,971,538 B1 | 3/2015 | Marr et al. | |
| 8,972,966 B2 | 3/2015 | Kelso et al. | |
| 9,218,178 B2 | 12/2015 | Young et al. | |
| 9,235,403 B2 | 1/2016 | Flynn | |
| 9,246,690 B1 | 1/2016 | Roth et al. | |
| 9,251,336 B1 | 2/2016 | Semenzato et al. | |
| 9,311,641 B2 | 4/2016 | Taveau et al. | |
| 9,603,190 B2 | 3/2017 | Choi et al. | |
| 2003/0009752 A1 | 1/2003 | Gupta | |
| 2004/0010702 A1 | 1/2004 | Lewis | |
| 2005/0132351 A1 | 6/2005 | Randall et al. | |
| 2006/0075276 A1 | 4/2006 | Kataria et al. | |
| 2006/0273438 A1 | 12/2006 | Anderson et al. | |
| 2007/0006208 A1 | 1/2007 | Nguyen et al. | |
| 2007/0073978 A1 | 3/2007 | Lee | |
| 2007/0089108 A1 | 4/2007 | Chen et al. | |
| 2007/0169073 A1 | 7/2007 | O'neill et al. | |
| 2007/0169075 A1 | 7/2007 | Lill et al. | |
| 2007/0198525 A1 | 8/2007 | Chatterjee et al. | |
| 2008/0141240 A1 | 6/2008 | Uthe | |
| 2009/0064125 A1 | 3/2009 | Venkatachalam et al. | |
| 2009/0282477 A1 | 11/2009 | Chen et al. | |
| 2011/0131447 A1 | 6/2011 | Prakash et al. | |
| 2012/0260244 A1 | 10/2012 | Keller et al. | |
| 2012/0266155 A1 | 10/2012 | Valeriano et al. | |
| 2013/0031374 A1 | 1/2013 | Thom et al. | |
| 2013/0055335 A1 | 2/2013 | Chien | |
| 2014/0004825 A1 | 1/2014 | Prakash et al. | |
| 2014/0007072 A1 | 1/2014 | Chhabra | |
| 2015/0268952 A1 | 9/2015 | Ponsini | |
| 2015/0294112 A1 | 10/2015 | Pintiysky et al. | |
| 2016/0004876 A1 | 1/2016 | Bye et al. | |
| 2016/0134318 A1 | 5/2016 | Wane | |
| 2016/0179738 A1 | 6/2016 | Guddeti et al. | |
| 2016/0203026 A1 | 7/2016 | Simitsis et al. | |
| 2016/0212174 A1 | 7/2016 | Raleigh | |
| 2016/0277933 A1 | 9/2016 | Moon | |
| 2016/0292423 A1 | 10/2016 | Yao et al. | |
| 2016/0313987 A1 | 10/2016 | Son et al. | |
| 2016/0337169 A1 | 11/2016 | Chhabra et al. | |
| 2016/0350543 A1 | 12/2016 | Kong et al. | |
| 2016/0364223 A1 | 12/2016 | Vandikas et al. | |
| 2016/0378996 A1 | 12/2016 | Smith et al. | |
| 2017/0075677 A1 | 3/2017 | Gross et al. | |
| 2017/0093861 A1 | 3/2017 | Kesavan et al. | |
| 2017/0222815 A1 | 8/2017 | Meriac et al. | |
| 2017/0286668 A1 | 10/2017 | Shanahan | |
| 2017/0322790 A1 | 11/2017 | Surdu | |
| 2018/0041345 A1 | 2/2018 | Maim | |
| 2018/0069707 A1 | 3/2018 | Loreskar et al. | |
| 2018/0081666 A1 | 3/2018 | Surdu | |
| 2019/0294503 A1 | 9/2019 | Olinsky et al. | |
| 2020/0012492 A1 | 1/2020 | Bonar et al. | |

OTHER PUBLICATIONS

Acohido, Byron, "Securing the Internet of Things: 'Side channel attacks' expose sensitive data collected by IoT devices", http://thirdcertainty.com/featured-story/securing-the-internet-of-things-side-channel-attacks-expose-sensitive-data-collected-by-iot-devices/, Nov. 30, 2015, 4 pages.

Hunt, Galen C.; "Connected Secure IoT Processor"; U.S. Appl. No. 15/629,622, filed Jun. 21, 2017; 38 pages.

Maxfield, Clive, "Single-chip end-to-end security for IoT devices connected to the Amazon cloud", http://www.embedded.com/electronics-blogs/max-unleashed-and-unfettered/4442574/Single-chip-end-to-end-security-for-IoT-devices-connected-to-Amazon-cloud, Aug. 18, 2016, 3 pages.

Miller, Jeff, "Identifying the Prime Challenge of IoT Design", http://semimd.com/blog/2015/12/18/identifying-the-prime-challenge-of-iot-design/, Dec. 18, 2015, 6 pages.

Silicon Labs Blue Gecko Bluetooth® Low Energy SoCs, http://www.mouser.in/new/Silicon-Laboratories/efr32bg-blue-gecko/, Retrieved on: Apr. 6, 2017, 2 pages.

Namiluko, et al., "Towards Enhancing Web Application SecurityUsing Trusted Execution", In Proceedings of the Workshop on Web Applications and Secure Hardware, Jun. 20, 2013, 9 pages.

"A System-Wide Approach to Security", http://www.arm.com/products/security-on-arm/trustzone, Published on: Nov. 21, 2016, 6 pages.

"Secure software and firmware update", http://www.infineon.com/cms/en/applications/smart-card-and-security/internet-of-things-security/secure-software-and-firmware-update/, Retrieved on: Dec. 29, 2016, 6 pages.

Namiluko, et al., "Towards Enhancing Web Application Security Using Trusted Execution", In Proceedings of the Workshop on Web Applications and Secure Hardware, Published on: Jun. 20, 2013, 9 pages.

Nightingale, Edmund B.; "IoT Device Update Failure Recovery"; U.S. Appl. No. 15/444,108, filed Feb. 27, 2017; 34 pages.

Nightingale, Edmund B.; "Secure IoT Device Update"; U.S. Appl. No. 15/444,024, filed Feb. 27, 2017; 42 pages.

Ordman, Roger, "Efficient over-the-air software and firmware updates for the Internet of Things", http://embedded-computing.com/articles/efficient-software-firmware-updates-the-internet-things/, Published on: Apr. 10, 2014, 5 pages.

Yu, et al., "Handling a trillion (unfixable) flaws on a billion devices: Rethinking network security for the Internet-of-Things", In Proceedings of the 14th ACM Workshop on Hot Topics in Networks, Nov. 16, 2015, 7 pages.

"Final Office Action Issued in U.S. Appl. No. 15/444,024", dated Jan. 7, 2019, 16 Pages.

"Non Final Office Action Issued in U.S. Appl. No. 15/444,024", dated Jun. 14, 2018, 15 Pages.

"Non Final Office Action Issued in U.S. Appl. No. 15/444,108", dated Sep. 7, 2018, 17 Pages.

"International Search Report and Written Opinion Issued in PCT Application No. PCT/US18/022527", dated Jun. 20, 2018, 10 Pages.

Wallace, Jim, "Securing the embedded IoT world", Retrieved From: https://community.arm.com/developer/ip-products/system/b/embedded-blog/posts/securing-the-embedded-iot-world, May 27, 2016, 12 pages.

"Notice of Allowance Issued in U.S. Appl. No. 15/444,024", dated Apr. 4, 2019, 9 Pages.

"Non-Final Office Action Issued in U.S. Appl. No. 15/629,622", dated Jun. 20, 2019, 12 Pages.

"Final Office Action Issued in U.S. Appl. No. 15/629,622", dated Dec. 20, 2019, 13 Pages.

\* cited by examiner

MULTIPLE CORES WITH HIERARCHY OF TRUST

CROSS-REFERENCE TO RELATED APPLICATION(S)

This application claims priority to U.S. Provisional Pat. App. No. 62/434,283, filed Dec. 14, 2016, entitled "MULTIPLE CORES WITH HIERARCHY OF TRUST". The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to integrated circuit technology with defense-in-depth. In one example of the technology, an integrated circuit includes a set of independent execution environments including at least two independent execution environments. At least two of the independent execution environments are general purpose cores with differing capabilities. The independent execution environments in the set of independent execution environments are configured to have a defense-in-depth hierarchy.

In examples of the disclosure, the independent execution environments are arranged in a hierarchy of defense in depth based on trust with different functions assigned to different layers of the hierarchy. Example of the different functions may include power, storage, Wi-Fi, and/or the like. In some examples, independent execution environments lower in the hierarchy than (i.e., less trusted than) the independent execution environment to which the function is assigned is restricted from accessing the function except by making a request to the independent execution environment that is assigned to the function. In some examples, even in the case of making a request, the independent execution environment that is lower in the hierarchy still does not itself have access; rather, it can only request that the independent execution environment that is assigned to the function perform such actions related to the function.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
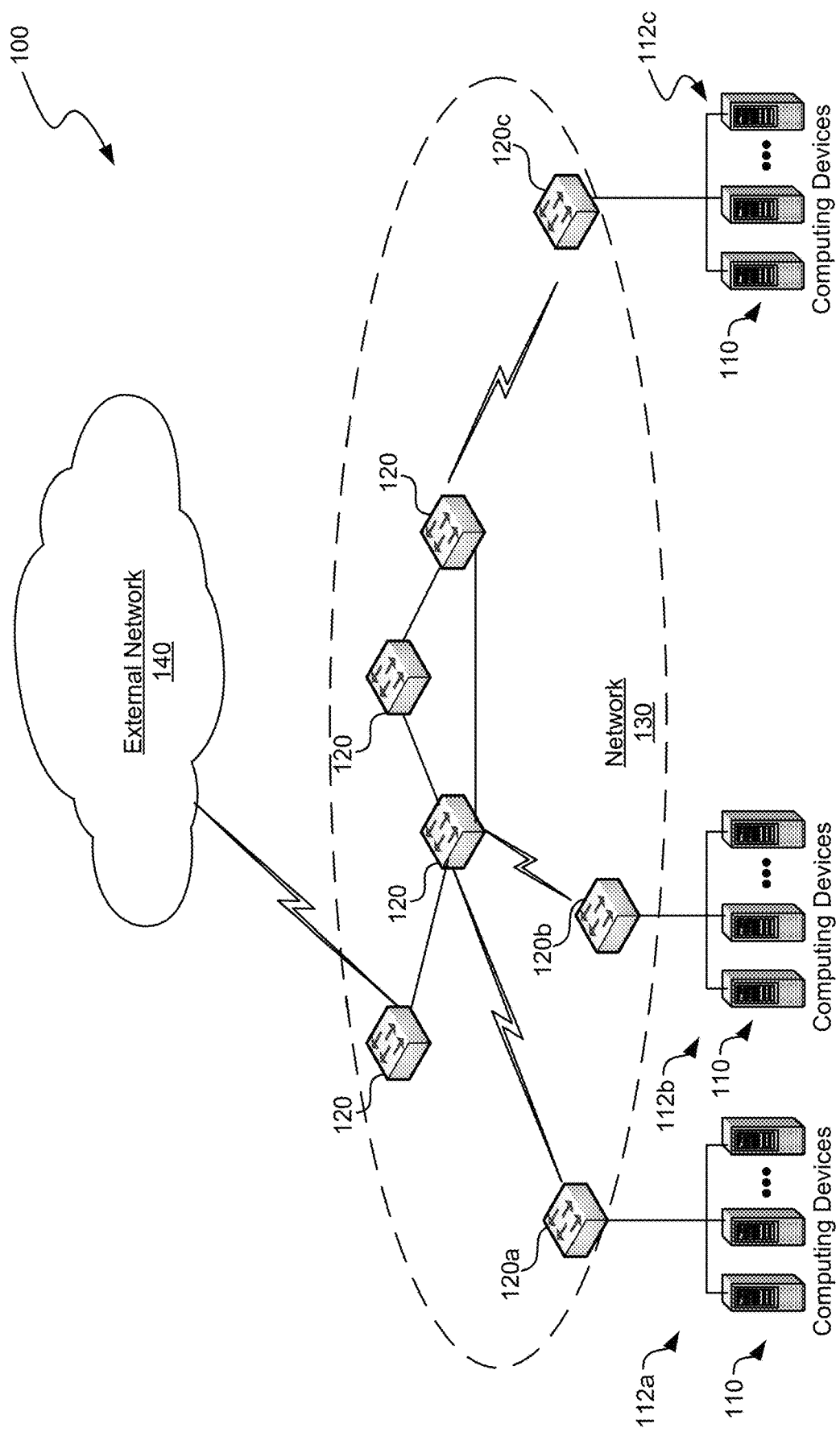
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to integrated circuit technology with defense-in-depth. In one example of the technology, an integrated circuit includes a set of independent execution environments including at least two independent execution environments. At least two of the independent execution environments are general purpose cores with differing capabilities. The independent execution environments in the set of independent execution environments are configured to have a defense-in-depth hierarchy.

In some examples, a device may operate as an IoT device via the presence of a hybrid chip, such as the integrated circuit discussed above, that provides, among other things, network connectivity. In some examples, the hybrid chip may have at least 4 MB of RAM and at least 4 MB of flash memory. In some examples, the hybrid chip provides not just network connectivity, but various other functions including hardware and software security, a monitored operating system, cryptographic functions, peripheral control, telemetry, and/or the like.

In examples of the disclosure, the independent execution environments in the hybrid chip are arranged in a hierarchy of defense-in-depth based on trust, with different functions assigned to different layers of the hierarchy, so that the layer of the hierarchy assigned to the function is responsible for the function. Example of the different functions may include power, storage, Wi-Fi, real-time clock write access, and/or the like. In some examples, independent execution environments lower in the hierarchy that the independent execution environment to which the function is assigned cannot access the function except by making a request to the independent execution environment that is assigned to the function. In some examples, even in the case of making a request, the independent execution environment that is lower in the hierarchy still does not itself have access; rather, it can only request that the independent execution environment that is assigned to the function perform such actions related to the function.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
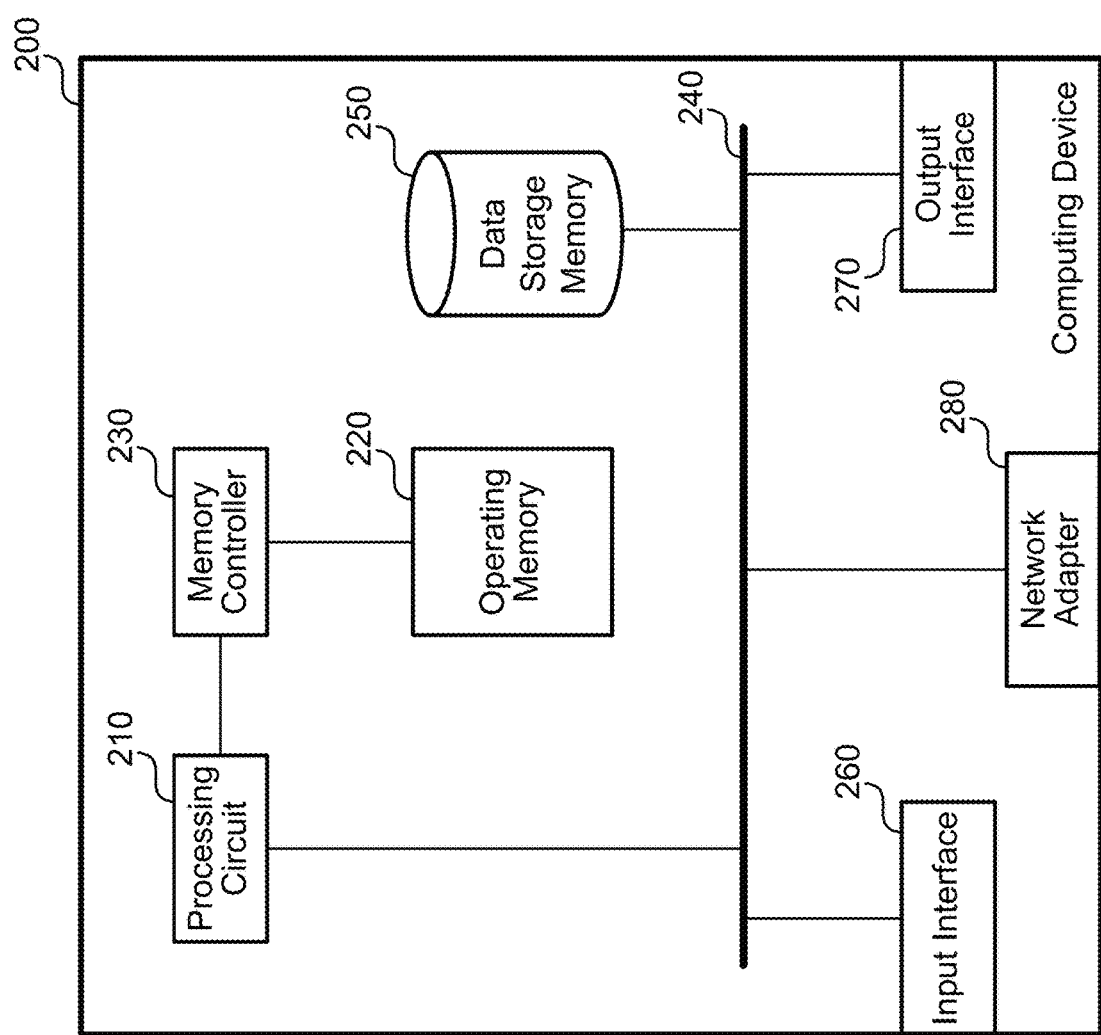
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
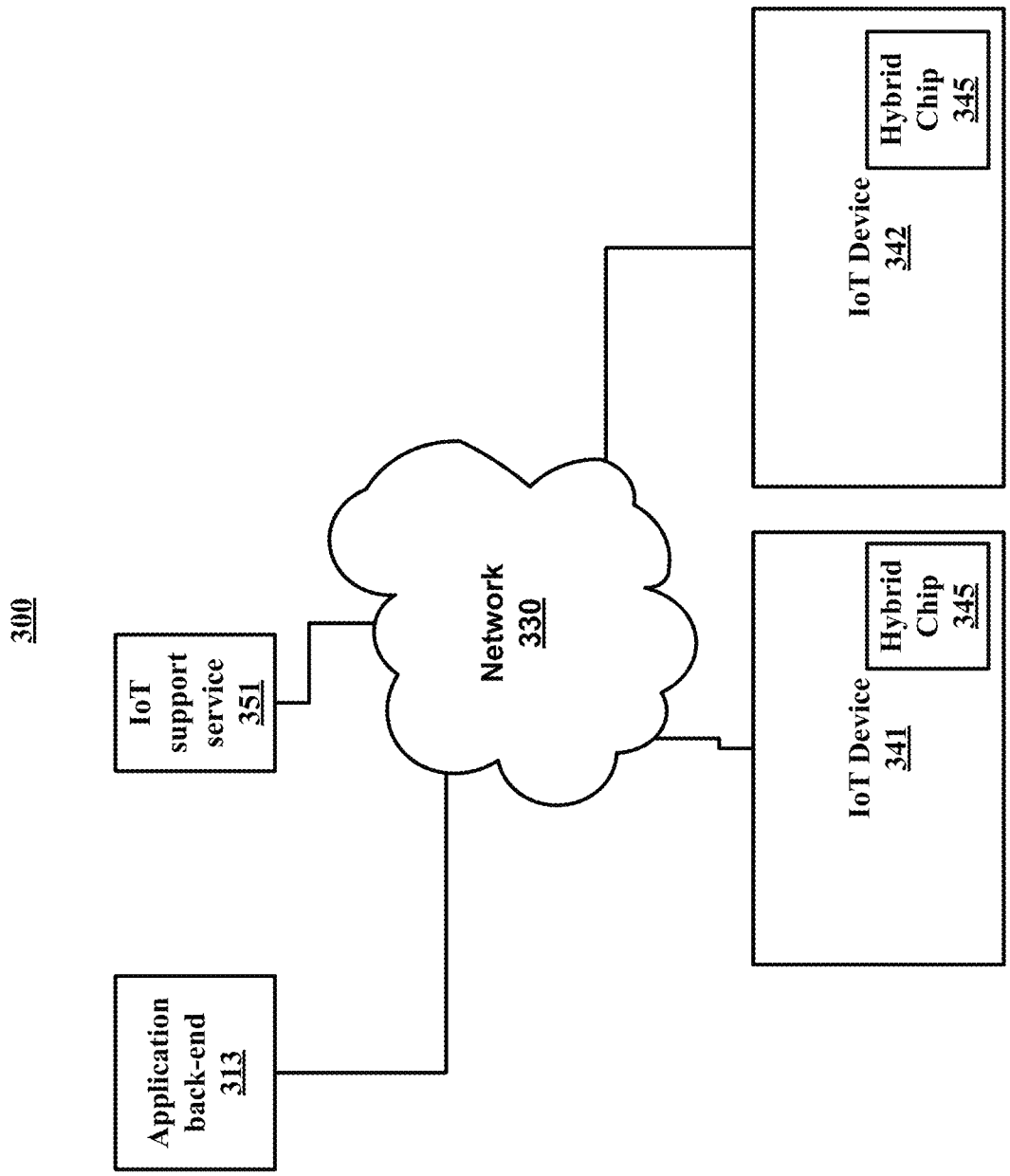
FIG. 3 is a block diagram illustrating an example of a system.

FIG. 3 is a block diagram illustrating an example of a system (300) for IoT data control. System 300 may include network 330, IoT support service 351, IoT devices 341 and 342, and application back-end 313, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

One or more of the IoT devices 341 and 342 includes hybrid chip 345. Each hybrid chip 345 may be an integrated circuit that includes a set of independent execution environments including at least two independent execution environments. At least two of the independent execution environments may be general purpose cores with differing capabilities. The independent execution environments in the set of independent execution environments may be configured in a defense-in-depth hierarchy.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services, such as IoT support service 351. Application back-end 313 includes a device or multiple devices that perform actions in providing a device portal to users of IoT devices.

System 300 may include more or less devices than illustrated in FIG. 3, which is shown by way of example only.

Illustrative Hybrid Chip

Figure 4:
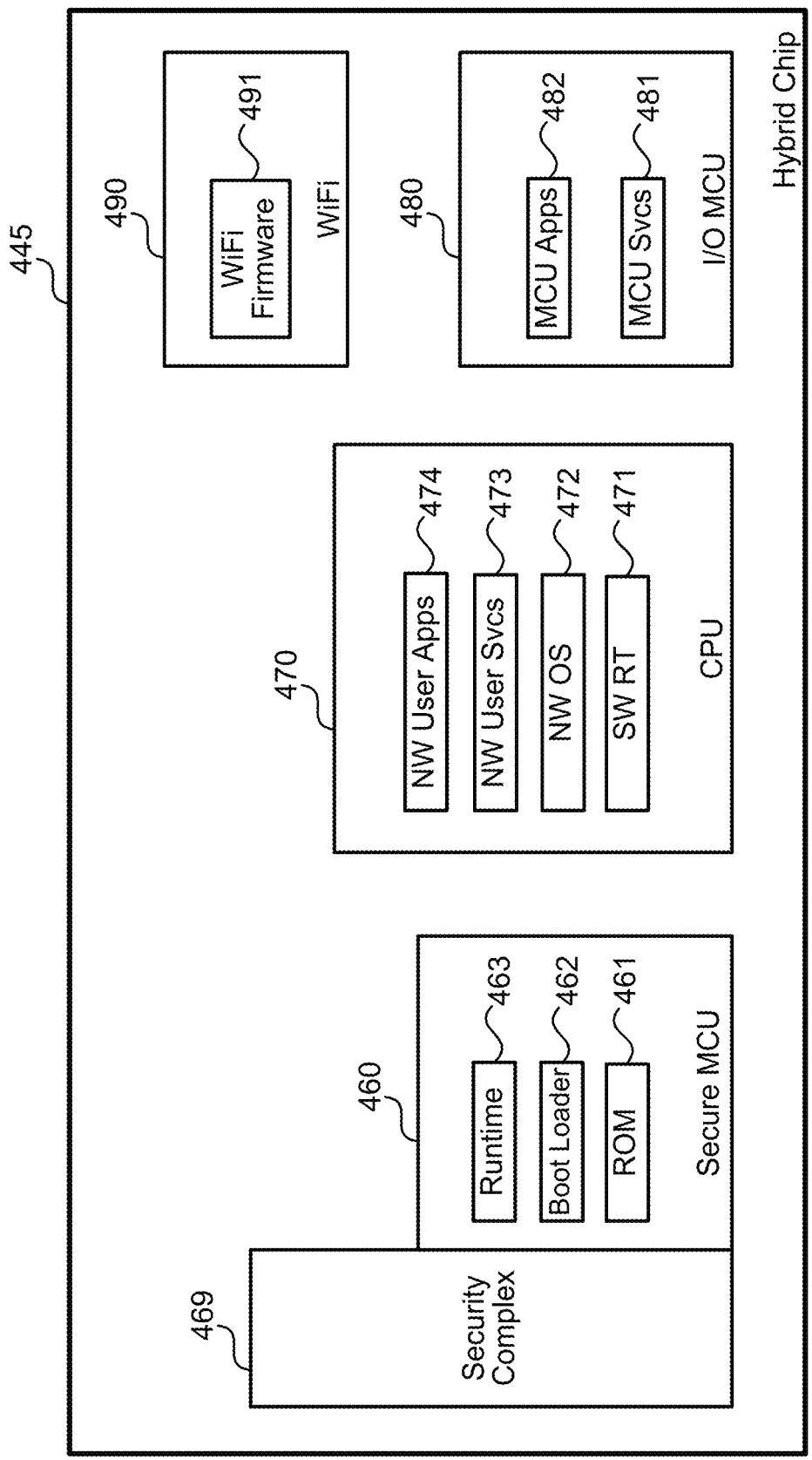
FIG. 4 is a block diagram illustrating an example of the hybrid chip of FIG. 3.

FIG. 4 is a diagram illustrating an example of a hybrid chip 445 with defense-in-depth architecture. FIG. 4 and the corresponding description of FIG. 4 in the specification illustrate an example process for illustrative purposes that do not limit the scope of the disclosure.

In some examples, hybrid chip 445 enables a device in which hybrid chip 445 is included to operate as an IoT device, such as IoT device 341 or 342 of FIG. 3. In some examples, hybrid chip 445 may have at least 4 MB of RAM and at least 4 MB of flash memory. In some examples, hybrid chip 445 provides not just network connectivity, but various other functions including hardware and software security, a monitored operating system, cryptographic functions, peripheral control, telemetry, and/or the like. In addition, hybrid chip 445 may include technology for allowing the device to be booted in a secure manner, allowing the device to be securely updated, ensuring that proper software is running on the device, allowing the device to function correctly as an IoT device, and/or the like.

Hybrid chip 445 is arranged as follows in some examples. Hybrid chip 445 includes core security complex 469, secure microcontroller (MCU) 460, general purpose CPU 470, at least one input/output (I/O) MCU 480, and core 490. Secure MCU 460 may include secure MCU read-only memory (ROM) 461, secure MCU first bootloader 462, and secure MCU runtime (RT) 463. CPU 470 may be an application processor that includes Secure World (SW) RT 471, Normal World (NW) operating system (OS) 472 that operates in supervisor mode, NW user-mode services 473, and NW user-mode applications 474. Each I/O MCU 480 may include MCU services 481 and MCU applications 482. Core 490 may include Wi-Fi firmware 491.

In some examples, core security complex 469 is the hardware root of trust in hybrid chip 469. In some examples, core security complex 469 is directly connected to secure MCU 460. In some examples, secure MCU 460 has a very high degree of trust, but is less trusted than core security complex 469. In these examples, secure MCU 460 controls one or more functions that require a very high degree of trust. In one example, secure MCU 460 controls power for hybrid chip 454 and/or an IoT device.

In some examples, the SW execution environment 471 of the CPU core is also part of the trusted computing base of the system. For instance, in some examples, SW RT 471 has unfettered access to reprogram hardware protection mechanisms, such as firewalls in some examples. In some examples, SW RT 471 does not, however, have access to the internals of core security complex 469 and relies on the secure MCU 460 for its most security-sensitive operations.

The NW execution environment of the CPU core may be configured to have limited access to such on-chip resources as memories. In some examples, the code running in this environment must still meet certain (e.g., relatively high) standards of security and quality but is less trusted than either the code running on the secure MCU 460 or the code running in Secure World 471 on the CPU.

In some examples, the I/O MCU cores 480 are less trusted than the secure MCU 460 and CPU cores, and as such, in some examples the CPU core's Secure World environment is responsible for configuring the firewalls of hybrid chip 445 to limit the access of 480 I/O MCU to on-chip resources.

In some examples, core 490 executes vendor-provided firmware. The core 490 may provide Wi-Fi functionality and connectivity to the Internet and cloud services such as IoT services. In some examples, core 490 may provide communications via Bluetooth and/or other connectivity technology. But as with the I/O MCU cores 480, in some examples, the CPU 470 is responsible for configuring the firewalls to limit the access of core 490 to on-chip resources. In some examples, core 490 does not have any access to unencrypted secrets, and is not capable of compromising the execution of secure MCU core 460 or the CPU 470 core.

In some examples, each independent execution environment is managed by a single software component executing in a separate execution environment that is referred to the "parent" of the execution environment. In such examples, one exception may be that the hardware root of trust (core security complex 469 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, CPU Normal World is the environment that manages I/O MCU cores 480, but receives assistance from CPU Secure World 471 to do so (e.g. to configure firewalls, and to program the starting instructions of the I/O MCU 480).

For instance, in some examples, secure MCU RT 473 manages CPU SW RT 472, a component in CPU SW RT 471 manages NW OS 472, a component in CPU NW OS manages NW user-mode 473 and 474, and NW user-mode services 473 manages the I/O MCU cores 480 and the core 490.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, the independent execution environments achieve defense-in-depth based on a hierarchy of trust. In other examples, other suitable means of security may be employed.

For instance, in some examples, core security complex 469 is at the top of the hierarchy and is assigned to secrets (e.g., encryption keys), secure MCU RT 480 is next in the hierarchy and is assigned to controlling power, SW RT 471 is next in the hierarchy and is assigned to storage and to write access to a real time clock (RTC), NW OS 472 is next in the hierarchy and is assigned to Wi-Fi, NW user-mode applications 474 is next in the hierarchy and is assigned to applications, and the I/O MCU 480 cores are at the bottom of the hierarchy and are assigned to peripherals. In other examples, functions are assigned to independent execution environments in a different manner.

In some examples, each level of the hierarchy of trust except for the bottom (i.e., least trusted) level of the hierarchy has complete control to accept or reject any requests from a less trusted level, e.g., in terms of implementing support for the software they handle, and have the ability to rate limit or audit the requests from less trusted levels and to validate requests from lower levels to ensure that the requests correct and true. Also, as previously discussed, in some examples, each level of hierarchy except the top (i.e., most trusted) level has a parent that is responsible for managing the lower (i.e., less trusted) level, including monitoring the software of the lower level and ensuring that the software on the lower level is running correctly.

In some examples, the layers of the hierarchy make use of secure communications channels and firewalls. For instance, in some examples, secure MCU RT 471 has two message queues, configured such that, based on the hardware, one of the queues can only be used in SW, and one that can be used from NW. In one particular example, if a message comes from the SW queue, then based on the hardware the message must have come from the SW, and is therefore more trusted than a message that came from NW. In other examples, other suitable means of security may be employed.

Additionally, in some examples, apart from the highest layer of the hierarchy, no layer of the hierarchy starts without a higher level of the hierarchy having validated the layer and, after validating the layer, allowed the layer to start. Also, in these examples, a layer of the hierarchy has the ability to stop any lower level of hierarchy, for example, at any time. Accordingly, in these examples, hybrid chip 445 has the software capability of each layer of the hierarchy having complete dominance over lower (i.e., less trusted) levels of the hierarchy in terms of stopping and starting and running of the lower levels of the hierarchy.

In some examples, core security complex 469 is the hardware root of trust and the highest, most trusted level of the defense-in-depth trust hierarchy. In some examples, core security complex 469 contains keys, secrets, encryption engines, and/or the like. In some examples, core security complex 469 stores secrets, performs functions such as key generation, encryption, decryption, hashing, other cryptographic functions, other security-related functions, and/or the like. In some examples, core security complex 469 is able to check the secret value stored in a one-way writable memory such as an e-fuse, one time programmable element, and/or the like.

In some examples, when Hybrid chip 445 is powered on and its power management unit (PMU) has stable power, it releases the Core security complex 469 from reset. In some examples, the Core security complex 469 is at the core of Hybrid chip 445's trusted computing base. In some examples, core security complex 469 drives the secure boot process. In one particular example, cores are restricted from executing code until the Core security complex 469 has enabled it to do so. In other examples, other suitable means of security may be employed.

In some examples, execute in place (XiP) is not used on the secure MCU core 460, in order to avoid the possibility of undetected runtime writes to flash resulting in untrusted code executing on secure MCU core 460. In one particular example, the ROM 461 and software runtime 463 instead ensure that code executing on secure MCU core 460 is copied into the private SRAM of secure MCU core 460 from flash and validated before executing. In other examples, other suitable means of security may be employed.

In some examples, the secure MCU 460 does not contain a memory management unit (MMU), but does contain a memory protection unit (MPU) that can be used to provide some safeguards—such as controlling the readability, writability, and executability of portions of the physical address space. The MPU may be used in this fashion, e.g. marking stacks and memory-mapped flash as no-execute.

In some examples, secure MCU ROM 461 is responsible for initializing enough of hybrid chip 445 so that the first piece of software stored in flash can securely execute on the secure MCU 460.

In some examples, upon entry, the ROM code on secure MCU ROM 461 waits for indication that the secure MCU 460 has completed initialization, reads the e-fuse indicating the device's security state, configures Phase Locked Loops (PLLs) to set the desired steady-state, chip frequency, and enables memory mapping of flash (for all cores). In some examples, although the secure MCU core 460 does not execute code directly from flash, it does leverage this mechanism to easily read and copy data from flash to its SRAM.

In these examples, after it has completed this configuration, the ROM code is responsible for loading and transferring control to secure MCU-boot loader 462, which is the first-level boot loader of secure MCU 460. In some examples, secure MCU-boot loader 462 is found in flash, both encrypted and signed, at known locations. In these examples, the ROM code validates the code, and loads it into the private SRAM of secure MCU 460. In some examples, secure MCU-boot loader 462 contains the first instruction of non-ROM code executed on Hybrid chip 445, and is a fixed size (e.g., 16 k) raw binary. In some examples, secure MCU-boot loader 462 is responsible for loading, validating, and transferring control to the secure MCU Runtime 463, setting up the device's software key store, implementing a low-level "recovery mode" for re-programming flash (used for development purposes, and possibly also for in-the-field updates—appropriately secured), applying updates/rollbacks, and configuring and kicking a secure watchdog timer in secure MCU 460 (until the secure MCU-RT 463 takes control).

Much like the ROM code before it, in these examples, secure MCU-boot loader 462 locates the secure MCU-RT code in flash, validates the code, loads the code into the private SRAM of secure MCU 460, and transfers control to the code. In some examples, once secure MCU boot loader 462 has transferred execution in this way, secure MCU-boot loader 462 will not regain control, and secure MCU-boot loader 462 will not remain resident in the SRAM of secure MCU 460 after secure MCU-boot loader 462 has finished executing.

In some examples, secure MCU runtime 463 is responsible for managing the CPU SW environment. In some examples, secure MCU is also responsible for managing and controlling power domains and other critical components, e.g., properly setting up debug enabling signals for other cores, powering on or off different domains on Hybrid chip 445, re-configuring and kicking the own watchdog timer of secure MCU 460 (taking over for secure MCU-boot loader), configuring the watchdog timer of CPU 470 and responding to its reset interrupt, and waking up a core (CPU 470 or I/O MCU 480) that has been powered off but received an interrupt. In some examples, secure MCU RT 463 is responsible for monitoring SW RT 471 of the CPU 470 to ensure that SW RT 471 is running correctly and to reset SW RT 471.

Secure MCU RT 463 interacts with core security complex 469 to request that core security complex 469 perform tasks associated with core security complex 469. For instance, secure MCU RT 463 may request security complex 469 to extract keys, or to request that core security complex 469 do something with the extracted keys, to request that core security complex 469 generate a pin number, to request that something be encrypted by core security complex 469 and the encrypted version returned to secure MCU RT 463, and/or the like. In some examples, secure MCU RT 463 acts in essence as the operating system for core security complex 469.

Secure World on the CPU 470 may have a trust zone that creates a private independent execution environment that is hardware-protected from the rest of hybrid chip 445. Secure World may have a runtime, Secure World runtime 471. In some examples, the Secure World (SW) environment on the CPU 470 is part of Hybrid chip 445's trusted computing base, and as such does not execute third-party code. For example, SW may have its own kernel and user mode processes. SW RT 471 may be responsible for protecting security-sensitive hardware resources on Hybrid chip 445, safely exposing limited access to these resources, and acting as a watchdog for the CPU's Normal World (NW) environment 472-474. For instance, in some examples, SW RT 471 is responsible for monitoring NW OS 472, ensuring the NW OS 472 is running correctly, and resetting NW OS 472. The Normal World (NW) environment on the CPU 470 may host NW OS 472, NW user-mode services 473, and NW user-mode applications 474. In some examples, SW RT 471 is responsible for forwarding requests to secure-MCU 463 RT from layers that do not have access to secure-MCU 463 rt.

In some examples, the CPU core 470 does not contain ROM code; instead, CPU core 470 contains an 8-byte volatile memory that contains the first instruction(s) for it to execute upon being taken out of reset. In these examples, before the CPU 470 is taken out of reset, the 8-byte volatile memory is programmed by the secure MCU 460 to contain a branch to the first instruction of the CPU SW RT 471, executing from shared SRAM. In some examples, CPU 470 is configured such that the code that executes in Secure World RT 471 executes from a range of SRAM that is configured to be inaccessible to Normal World 472-474.

In some examples, SW RT 471 is also responsible for booting Normal World 472-474 on the CPU 470, exposing runtime services to software running in Normal World 472-474, access to real-time clock (RTC), I/O MCU 480 management API, N9 490 management API, managing silicon components not accessible to Normal World 472-474 (and which do not need to be managed by the secure MCU 460), interacting with the flash controller in macro mode, programming CPU SW 471 DMA engine, configuration of all firewalls, configuration of the core I/O mapping, handling interrupts indicating firewall violations, taking I/O MCU 480 and N9 490 cores out of reset, configuring watchdog timers for I/O MCU 480 cores, configuring the Real-time clock (RTC), and managing updates for certain software components. Because Secure World also contains multiple hardware modes (i.e. supervisor mode, user mode), the SW RT 471 may internally span multiple modes for additional defense-in-depth.

In some examples, SW RT 471 operates below secure-MCU RT 463 in the trust/defense-in-depth hierarchy, but above NW OS 472 in the hierarchy. In these examples, whereas secure-MCU RT 463 can, for instance, request that core security complex 469 generate a pin number, SW RT 471 cannot. Also, in these examples, whereas secure-MCU RT 463 has access to power, SW RT 471 does not. However, in these examples, SW RT 471 is in charge of managing storage, and layers of the hierarchy below SW RT 471 do not have access to storage.

As discussed, in some examples, the SW environment of CPU 470 is a hardware-protected private execution environment of CPU 470. The rest of the software environment of CPU 470, other than the SW environment, is the NW environment. There are registers that the SW can read but the NW cannot in some examples. The NW environment may include a supervisor mode and a user mode. The supervisor mode of the NW environment of CPU 470 may include NW OS 472. The user mode of the NW environment of CPU 470 may include NW user-mode services 473 and NW user-mode applications 474.

In some examples, NW OS 472 is responsible for managing the resources for NW user-mode applications 474. In some examples, NW OS 472 is responsible for managing Wi-Fi, and layers hierarchically below (i.e., less trusted than) NW OS 472 do not have direct access to Wi-Fi, but can only access Wi-Fi indirectly via NW OS 472.

In some examples, in CPU NW user-space, a set of runtime services 473 are run that are responsible for: booting I/O MCU cores 480 (with assistance from SW RT 471), booting the core 490 (with assistance from SW RT 471), publishing device telemetry to IoT services, publishing diagnostic information to IoT services, receiving and applying software updates from IoT services, and handling reset interrupts from I/O MCU 480 watchdog timers.

In some examples, the CPU Device API internally leverages NW user-mode Runtime Services 473, and abstractly provides third-party Application Code hosted on the CPU (in NW) with access to the following functionality: publishing device telemetry, publishing diagnostic information, communicating with I/O MCU cores 480, controlling and issuing I/O to peripheral, and Application Code. In some examples, product manufacturers and other customers of hybrid chip 445 may author third-party code to execute on the CPU core in NW. In some examples, the code is able to use the CPU Device API, and may coordinate with I/O runtimes executing on I/O MCU cores 480.

In some examples, hybrid chip 445 contains two "I/O" MCU cores 480 intended for use by customers, for sensing and actuation. In some of these examples, neither I/O MCU core 480 contains any ROM code. Instead, in these examples, each I/O MCU core 480 contains an 8-byte volatile memory mapped at a particular physical address. When an I/O MCU 480 core starts executing, it may fetch its initial instructions from this address. Before each I/O MCU core 480 is taken out of reset, the 8-byte volatile memory may be programmed by the CPU 470 to contain a branch to the first instruction of an I/O MCU Loader, XiP from flash.

In some examples, a company can use the I/O MCU core 480 microcontrollers to include the code that is on their existing microcontrollers, which may allow a company to replace their existing microcontroller functionality with hybrid chip 445.

In some examples, hybrid chip 445's Wi-Fi stack executes on core 490 programmed by the silicon vendor producing the chip.

While FIG. 4 illustrates a particular example of hybrid chip 445, many other examples of hybrid chip 445 are possible. For instance, the number and type of independent execution environments may vary in different examples. Hybrid chip 445 has at least two general purpose cores with differing capabilities, so that hybrid chip 445 has heterogeneous cores. The at least two general purpose cores with differing capabilities may be at least a microcontroller and a CPU in one example, while other general purpose cores with different capabilities are used in other examples. The two cores are general purpose in that any suitable code can be run on the cores. For example, the MCU microcontroller and the CPU are general purpose cores, whereas a graphic processing unit (GPU) is not a general-purpose core; rather, a GPU is used to process very specific types of calculates, and can only run certain types of executions. While the two cores in hybrid chip 445 are both general purpose and each can run any suitable code, they have differing capabilities from each other. Although the CPU and the MCU microcontroller are both general-purpose cores, the CPU is significantly more powerful than the MCU microcontroller and can execute instructions that the MCU microcontroller cannot. This is but one example of two general purpose cores with differing capabilities. While specific cores are discussed herein, such as the CPU and the MCU, in other examples, other general purpose cores may be employed such as any general purpose CPU, microcontroller, or the like. Also, various quantities of cores may be employed in various examples.

Also, in various examples, different functions may be assigned to different levels of the hierarchy. For instance, in the example of hybrid chip 445 illustrated in FIG. 4, the function of controlling power is assigned to a more trusted level of the hierarchy than the function of managing storage. However, in other examples, the function of managing storage is assigned to a more trusted level of the hierarchy than the function of controlling power.

Figure 5:
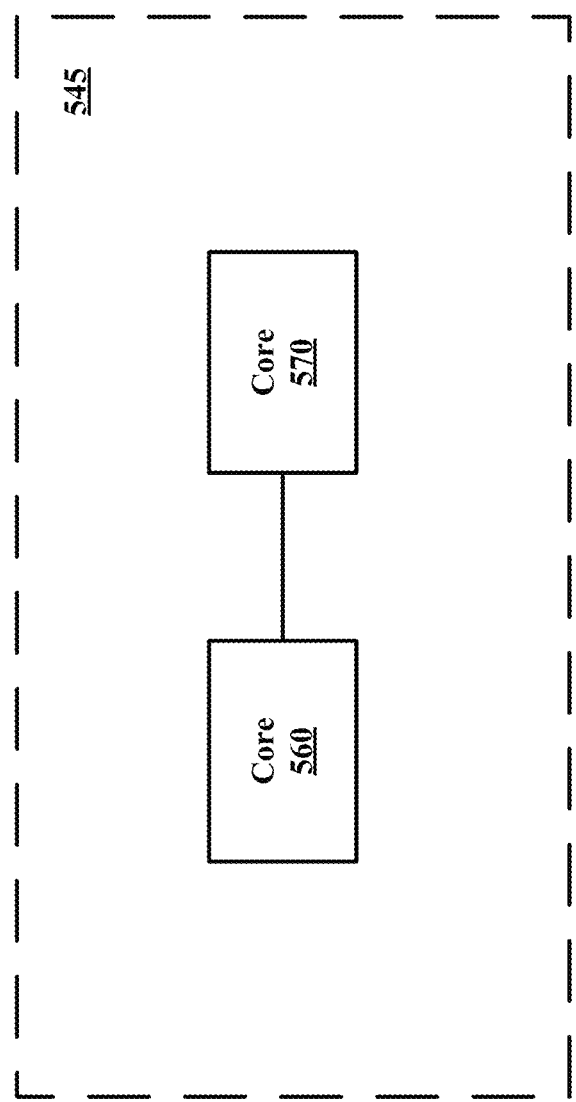
FIG. 5 is a block diagram illustrating another example of the hybrid chip of FIG. 3, arranged in accordance with aspects of the present disclosure.

FIG. 5 is a block diagram illustrating an example hybrid chip 545, which may be employed as another example of hybrid chip 345 of FIG. 3. Hybrid chip 545 includes core 560 and core 570.

Hybrid chip 545 is an integrated circuit, including a set of independent execution environments. The set of independent execution environments include at least two independent execution environments. At least two of the at least two independent execution environments are general purpose cores with differing capabilities. The general-purpose cores with differing capabilities include core 560 and core 570. The independent execution environments in the set of independent execution environments are configured to have a defense-in-depth hierarchy.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for defense-in-depth, comprising:
an integrated circuit, including:
a set of independent execution environments including at least two independent execution environments, wherein at least two of the at least two independent execution environments are general purpose cores with differing capabilities, wherein the general purpose cores with differing capabilities include at least a first microcontroller and a first central processing unit (cpu), wherein the first microcontroller does not include a trusted execution environment (TEE), and wherein the independent execution environments in the set of independent execution environments are configured to have a defense-in-depth hierarchy.

2. The apparatus of claim 1, wherein the apparatus includes an IoT device that includes the integrated circuit.

3. The apparatus of claim 1, wherein one of the independent execution environments is responsible for controlling integrated circuit power, and wherein the independent execution environments hierarchically below the independent execution environment that is responsible for controlling power is prevented from controlling power except by sending a request to the independent execution environment that is responsible for controlling power.

4. The apparatus of claim 1, wherein one of the independent execution environments is responsible for managing storage, and wherein the independent execution environments hierarchically below the independent execution environment that is responsible for storage is restricted from accessing storage except by sending a request to the independent execution environment that is responsible for managing storage.

5. The apparatus of claim 1, wherein the independent execution environments in the set of independent execution environments are configured to have a defense-in-depth hierarchy that is a hierarchy from least trusted to most trusted, wherein the independent execution environments include independent execution environments each configured to monitor, boot, resume, and reset an independent execution environment that is less trusted than the independent execution environment.

6. The apparatus of claim 1, wherein the independent execution environments in the set of independent execution environments are configured to have a defense-in-depth hierarchy that is a hierarchy from least trusted to most trusted, wherein the independent execution environments include independent execution environments each configured to rate-limit requests from less trusted independent execution environments.

7. The apparatus of claim 1, wherein one of the independent execution environments is responsible for network access, and wherein the independent execution environments hierarchically below the independent execution environment that is responsible for network access is restricted from accessing network access except by sending a request to the independent execution environment that is responsible for network access.

8. The apparatus of claim 1, wherein one of the independent execution environments is responsible for write access to a real-time clock, and wherein the independent execution environments hierarchically below the independent execution environment that is responsible for write access to the real-time clock is restricted from accessing write access to the real-time clock except by sending a request to the independent execution environment that is responsible for write access to the real-time clock.

9. The apparatus of claim 1, wherein the plurality of independent execution environments further include a secure world runtime on the first CPU, and a normal world operating system on the first CPU.

10. The apparatus of claim 1, wherein the plurality of independent execution environments includes a core security complex that is configured as a hardware root of trust for the integrated circuit.

11. The apparatus of claim 1, wherein the plurality of independent execution environments includes a second microcontroller that is configured as an input/output (I/O) microcontroller.

12. A method for defense-in-depth, comprising:
using a software architecture to configure a set of independent execution environments on an integrated circuit including at least two independent execution environments, wherein at least two of the at least two independent execution environments are general purpose cores with differing capabilities, and wherein the software architecture is further used to configure the set of independent execution environments such that the independent execution environments have a defense-in-depth hierarchy, wherein the general-purpose cores with differing capabilities include at least a first microcontroller and a first central processing unit (CPU), and wherein the first microcontroller does not include a trusted execution environment (TEE).

13. The method of claim 12, wherein the software architecture is further configured such that one of the independent execution environments is responsible for controlling integrated circuit power, and such that the independent execution environments hierarchically below the independent execution environment that is responsible for controlling power cannot access power except by sending a request to the independent execution environment that is responsible for controlling power.

14. The method of claim 12, wherein the software architecture is further configured such that one of the independent execution environments is responsible for managing storage, and such that the independent execution environments hierarchically below the independent execution environment that is responsible for managing storage is restricted from accessing storage except by sending a request to the independent execution environment that is responsible for managing storage.

15. The method of claim 12, wherein the software architecture is further configured such that the independent execution environments in the set of independent execution environments have a defense-in-depth hierarchy that is a hierarchy from least trusted to most trusted, and such that the independent execution environments include independent execution environments each configured to monitor, boot, and reset an independent execution environment that is less trusted than the independent execution environment.

16. The method of claim 12, wherein the software architecture is further configured such that the independent execution environments in the set of independent execution environments have a defense-in-depth hierarchy that is a hierarchy from least trusted to most trusted, and such that the independent execution environments include independent execution environments each configured to rate-limit requests from less trusted independent execution environments.

17. A processor-readable storage medium, having stored thereon process-executable code that, upon execution by at least one processor, enables configuration of a set of independent execution environments on an integrated circuit including at least two independent execution environments, wherein at least two of the at least two independent execution environments are general purpose cores with differing capabilities, such that the independent execution environments in the set of independent execution environments are configured to have a defense-in-depth hierarchy, such that a first general purpose core controls a first function, a second general purpose core is lower in the defense-in-depth hierarchy than the first general purpose core, the second core cannot access the first function, and such that the first function is at least one of controlling power or managing storage, wherein the general-purpose cores with differing capabilities include at least a first microcontroller and a first central processing unit (CPU), and wherein the first microcontroller does not include a trusted execution environment (TEE).

18. The processor-readable storage medium of claim 17, wherein the independent execution environments in the set of independent execution environments are configured to have a defense-in-depth hierarchy that is a hierarchy from least trusted to most trusted, such that the independent execution environments include independent execution environments each configured to monitor, boot, and reset an independent execution environment that is less trusted than the independent execution environment.

* * * * *